(12) United States Patent
Fontanet et al.

(10) Patent No.: US 11,655,845 B2
(45) Date of Patent: May 23, 2023

(54) THREADED INSERT FOR SANDWICH PANEL, METHOD OF ASSEMBLY, AND CORRESPONDING ASSEMBLY

(71) Applicant: SECAM, Marnaz (FR)

(72) Inventors: Florent Fontanet, Marnaz (FR); Lucien Garby, Marnaz (FR); David Rigal, Marnaz (FR); Gerard Pernat, Marnaz (FR)

(73) Assignee: SECAM, Marnaz (FR)

( * ) Notice: Subject to any disclaimer, the term of this patent is extended or adjusted under 35 U.S.C. 154(b) by 376 days.

(21) Appl. No.: 16/900,198

(22) Filed: Jun. 12, 2020

(65) Prior Publication Data
US 2020/0392977 A1 Dec. 17, 2020

(30) Foreign Application Priority Data

Jun. 12, 2019 (FR) ...................................... 19 06235

(51) Int. Cl.
*F16B 1/00* (2006.01)
*F16B 37/12* (2006.01)
*F16B 5/01* (2006.01)

(52) U.S. Cl.
CPC .............. *F16B 37/122* (2013.01); *F16B 5/01* (2013.01)

(58) Field of Classification Search
CPC ........ F16B 5/01; F16B 37/122; F16B 37/065; F16B 37/067
USPC ....................................................... 411/82.1
See application file for complete search history.

(56) References Cited

U.S. PATENT DOCUMENTS

| | | | | |
|---|---|---|---|---|
| 3,019,865 A | | 2/1962 | Rohe | |
| 3,236,143 A | * | 2/1966 | Wing | F16B 37/067 411/968 |
| 3,339,609 A | * | 9/1967 | Cushman | B64C 1/12 264/261 |
| 3,606,416 A | * | 9/1971 | Hatter | F16B 5/01 403/408.1 |
| 5,455,986 A | * | 10/1995 | Gentile | B29C 66/474 16/2.2 |

(Continued)

FOREIGN PATENT DOCUMENTS

| | | |
|---|---|---|
| DE | 10 2012 215 587 A1 | 6/2014 |
| FR | 3 014 968 A1 | 6/2015 |
| WO | WO 201 8/1781 93 A1 | 10/2018 |

OTHER PUBLICATIONS

French Preliminary Search Report dated Feb. 4, 2020 in French Application 19 06235 filed Jun. 12, 2019 (with English Translation of Categories of Cited Documents & Written Opinion), 10 pages.

*Primary Examiner* — Gary W Estremsky
(74) *Attorney, Agent, or Firm* — Oblon, McClelland, Maier & Neustadt, L.L.P.

(57) ABSTRACT

An insert intended to be assembled in a hole in a sandwich panel including a hollow cylindrical body having a flanged end deformable by a placement tool allowing mechanical connection by deformation with a surface skin of the sandwich panel is provided. The insert includes an anchoring stem in the continuation of the cylindrical body as well as an internal tube intended to collaborate with the placement tool. The anchoring stem has at least one circumferential groove and a peripheral rib, the circumferential groove and the peripheral rib each having a transverse profile that is rounded so as to be able to collaborate with a curable substance.

16 Claims, 12 Drawing Sheets

(56) References Cited

U.S. PATENT DOCUMENTS

| | | | | |
|---|---|---|---|---|
| 5,632,582 A * | 5/1997 | Gauron | ............... | F16B 5/01 |
| | | | | 411/258 |
| 7,195,436 B1 * | 3/2007 | Stephen | ............ | F16B 11/006 |
| | | | | 411/376 |
| 9,702,394 B2 | 7/2017 | Barney et al. | | |
| 2004/0265091 A1 * | 12/2004 | Cheung | ............ | B29C 66/474 |
| | | | | 411/338 |
| 2008/0138168 A1 * | 6/2008 | Schruff | ............ | F16B 37/067 |
| | | | | 29/707 |
| 2008/0292425 A1 * | 11/2008 | Pineiros | ............ | F16B 37/044 |
| | | | | 411/92 |
| 2012/0260490 A1 * | 10/2012 | Sakoda | .......... | F16B 19/1045 |
| | | | | 411/34 |
| 2015/0377272 A1 * | 12/2015 | Faguer | ............... | F16B 19/10 |
| | | | | 29/515 |
| 2017/0268560 A1 | 9/2017 | Barney et al. | | |
| 2018/0038399 A1 * | 2/2018 | Fischer | ............ | F16B 37/042 |
| 2020/0096032 A1 * | 3/2020 | Blaski | ............ | F16B 19/1072 |

\* cited by examiner

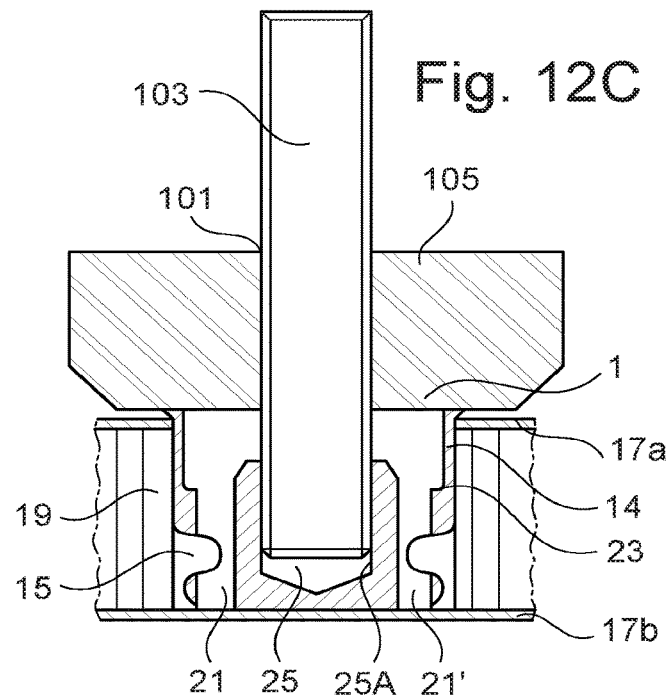
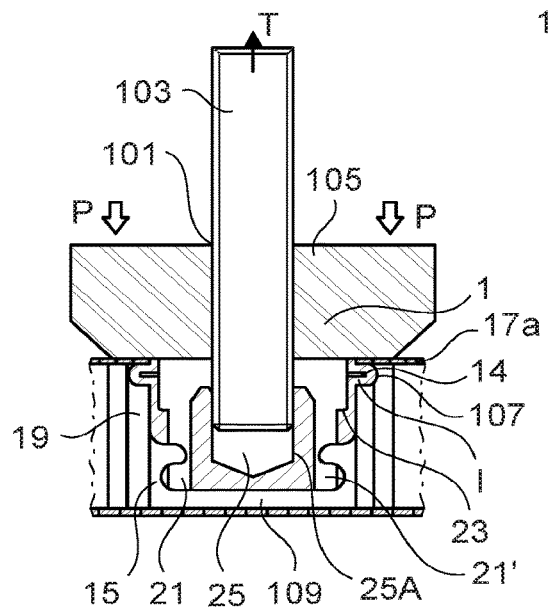
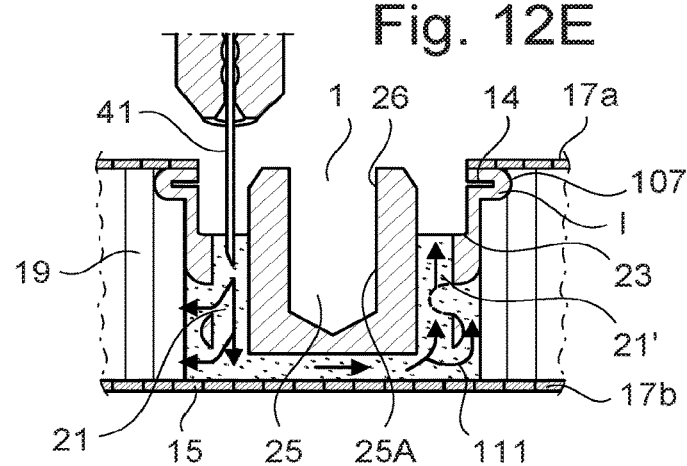

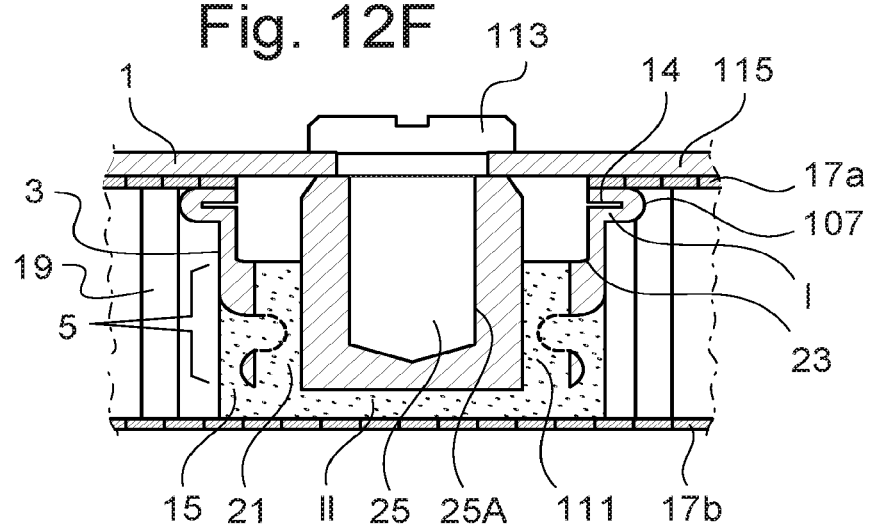
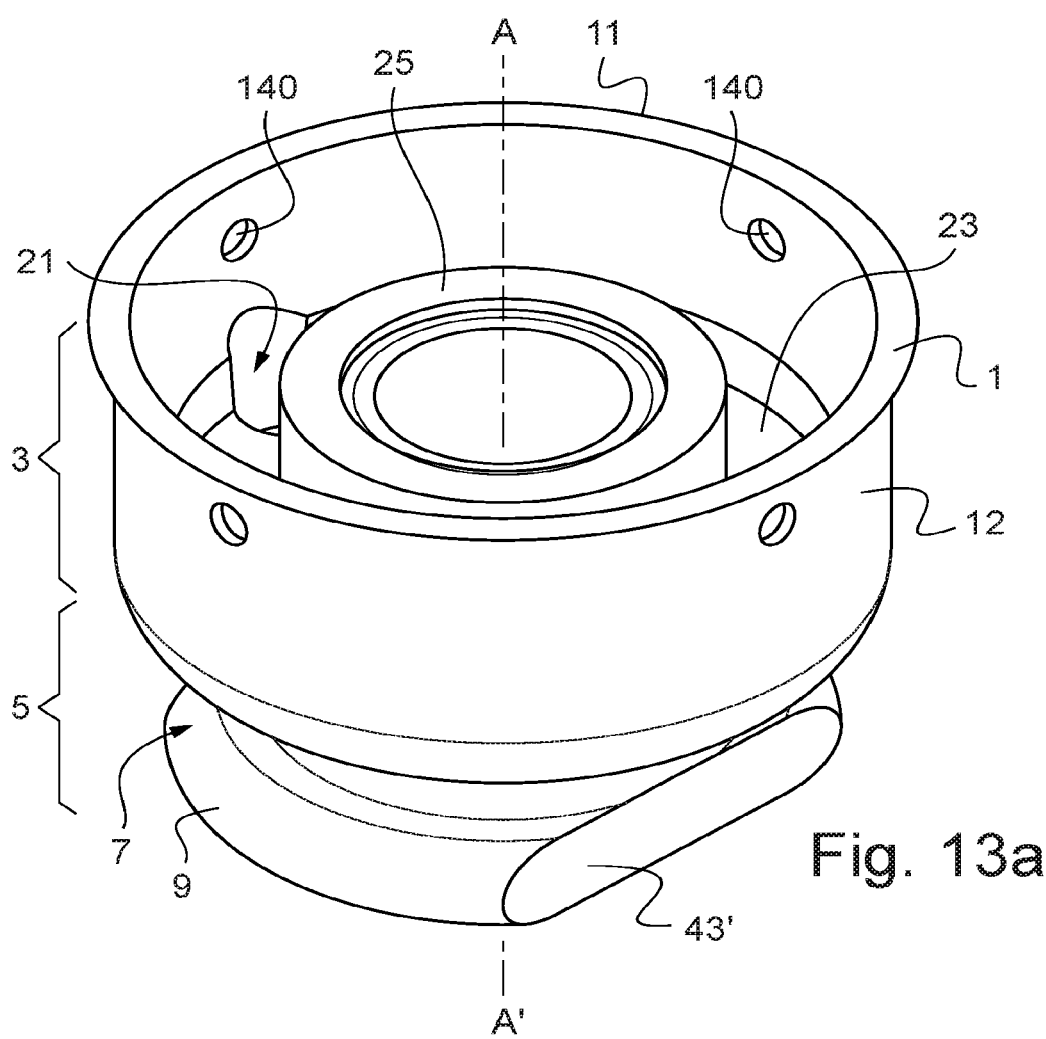

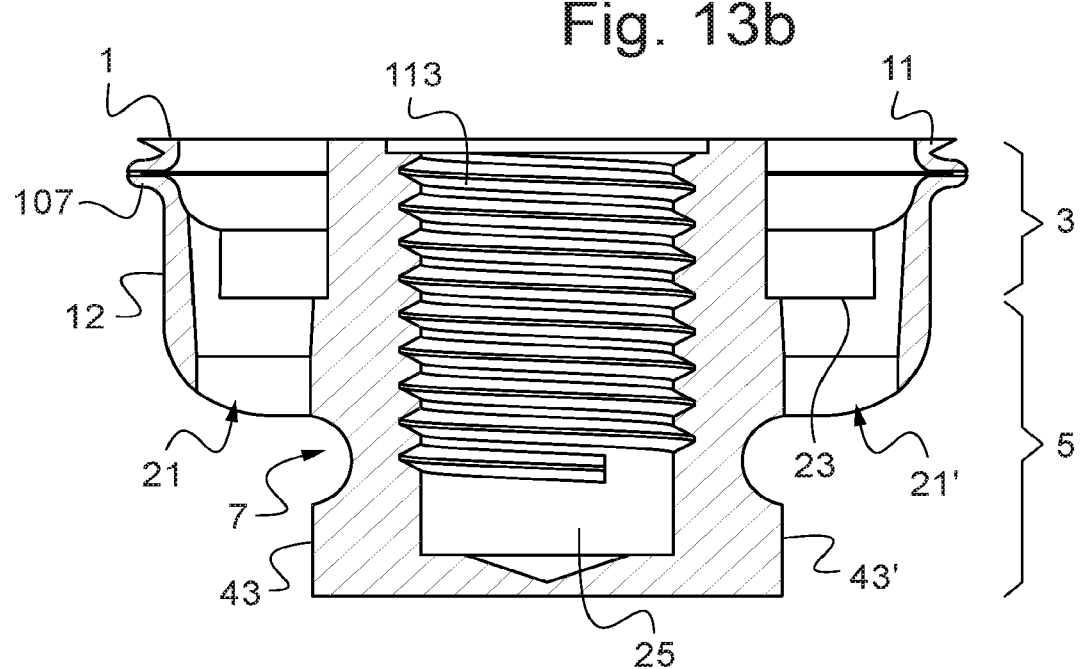
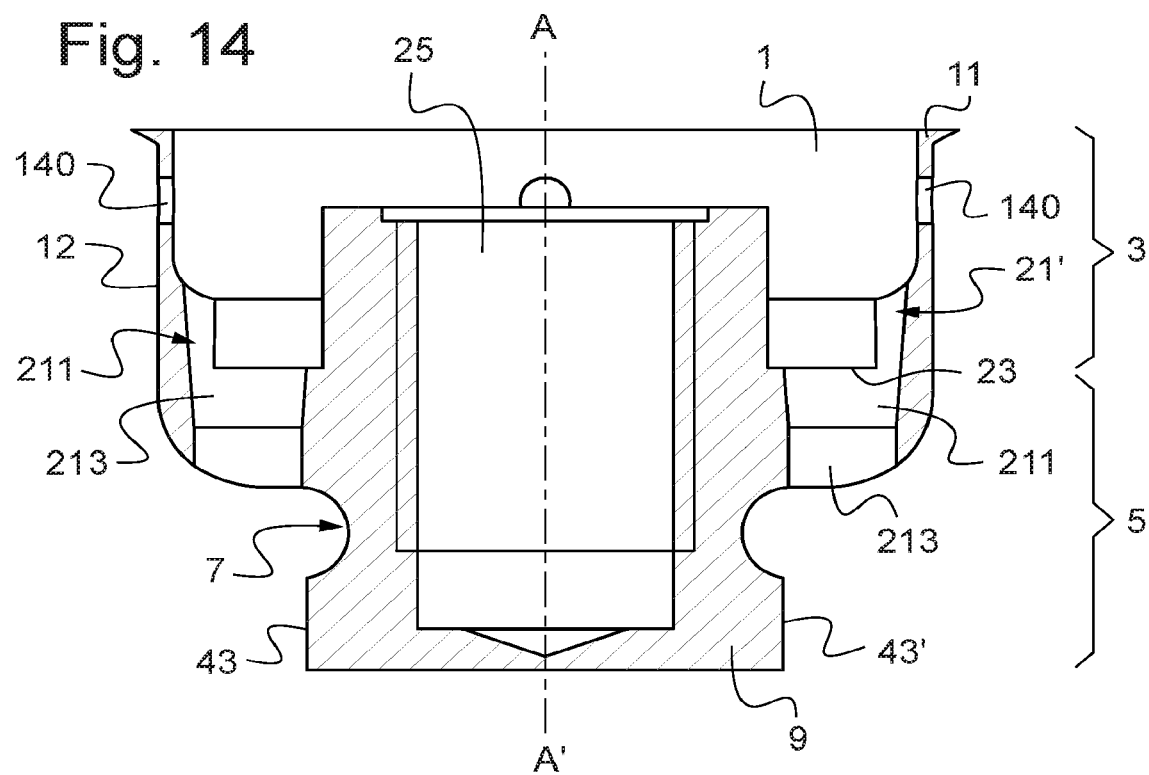

THREADED INSERT FOR SANDWICH PANEL, METHOD OF ASSEMBLY, AND CORRESPONDING ASSEMBLY

BACKGROUND OF THE INVENTION

Field of the Invention

The present invention relates to an insert, and particularly to a threaded insert designed for sandwich panels of the composite type notably having a honeycomb or foamed structure. The invention also relates to a method for assembling such an insert, and to an assembly comprising such an insert.

Description of the Related Art

A sandwich panel is often made up at its core for example of a honeycomb structure or a foam-based structure, to each side of which are affixed skins based on resin and on fiber glass. In the case of sandwich panels comprising a honeycomb structure comparable to the cellular structures formed by a bee, this structure serves to improve the strength of an element while at the same time ensuring maximum lightness of weight. The honeycomb core of a sandwich panel is made up of a void ratio of around 95%, allowing the lightness of weight of the material which is aluminum or else polypropylene. In the case of sandwich panels comprising a foam-based structure obtained from various components such as polyurethane, polyester adhesive, epoxy adhesive or else a metallic foam made up of aluminum, this type of structure offers a good stiffness/weight ratio, does not absorb water and presents optimal thermal insulation. These panels are very widely used in the aeronautical industry, and also in the automotive, watersports, wind turbine and also rail industries.

Given their very particular structure, it is difficult to use conventional fasteners such as screws. One known solution is to use an insert device that is inserted into a hole made beforehand in the sandwich panel. The difficulty is then that of connecting the insert device to the sandwich panel. This is because this connection needs to be strong enough to allow an element to be held on the panel.

Insert devices formed of two distinct parts comprising a threaded tubular rivet and a spacer bushing are also known. The threaded tubular rivet comprises a deformation chamber, an externally threaded region complementing the internal screw thread of the spacer bushing for the connection between the threaded tubular rivet and the spacer bushing. The spacer bushing also comprises a recess to accept a fitting tool. The method of assembling this type of insert in a hole in a sandwich panel comprises several steps. A first step consists in positioning the insert device in the hole. The second step consists in deforming the deformation chamber of the rivet using a positioning tool so as to form a mechanical connection between the insert and the surface skin of the sandwich panel. A final step consists in turning the spacer bushing with respect to the rivet using a fitting tool until the spacer bushing is brought into abutment against the end wall of the hole, so that the insert device is immobilized in the hole. Thus, the assembly method entails the use of several tools, thus increasing the assembly time and therefore the cost of a sandwich panel equipped with said insert devices. In addition, the use of this type of device leads to delamination or even detachment of the bottom skin on the opposite side to the one on the surface of said sandwich panel, notably if the turning of the threaded fasteners is not correctly mastered.

Furthermore, once assembled with the sandwich panel, the head of the insert devices protrudes from the surface of the skin of the sandwich panel, which prevents certain elements from being attached directly against the sandwich panel, and this can lead to a lack of stability of the attached element.

Document FR1362592, in the name of the applicant SECAM, discloses a threaded insert for a sandwich panel. This known insert has at its free end an anchoring stem directed toward the bottom of the hole in the sandwich panel and intended to collaborate with a curable substance then injected into the hole in the sandwich panel. The contour of this anchoring stem has roughnesses and teeth to afford the assembly greater strength to resist tensile forces. However, the roughnesses on the anchoring stem may lead to cracks, which are the cause of breakages in the curable substance and detract from the integrity of the assembly between the insert and the sandwich panel.

Finally, the injection of the curable substance directly through the internal tube may lead to curable substance being deposited on the tapped thread of said internal tube, preventing correct connection between the threaded tubular rivet and the spacer bushing.

BRIEF SUMMARY OF THE INVENTION

The invention seeks to propose a threaded insert designed for composite type sandwich panels having a honeycomb structure or else foam based, that makes it possible to alleviate one or more disadvantages of the prior art.

Another objective of the invention is to promote automation of the placement of the insert.

To this end, one object of the invention is to propose an insert intended to be assembled in a hole in a sandwich panel, comprising a hollow cylindrical body having a flanged end deformable by a placement tool allowing mechanical connection by deformation with a surface skin of said sandwich panel, said insert comprising an anchoring stem in the continuation of the cylindrical body as well as an internal tube intended to collaborate with the placement tool, wherein said anchor stem has at least one circumferential groove and a peripheral rib, the circumferential groove and the peripheral rib each having a transverse profile that is rounded so as to be able to collaborate with a curable substance.

The internal tube may be coaxial with the cylindrical body.

It may have an internal connection means, such as an internal tapped thread, intended to collaborate with the placement tool.

The rounded contour of the anchoring stem makes it possible to avoid concentrations of mechanical stresses and avoid the appearance of cracks in the curable substance.

Said insert may further comprise one or more of the following features considered separately or in combination.

The anchor stem has a cylindrical overall shape in the continuation of the cylindrical body, the diameter of said anchoring stem at the peripheral rib being less than or equal to the diameter of the cylindrical body.

The transverse profiles of the circumferential groove and of the peripheral rib succeed one another continuously.

The circumferential groove and the peripheral rib have semicircular transverse profiles.

The anchoring stem comprises two circumferential grooves and two peripheral ribs succeeding one another in alternation.

The internal tube is a blind tube.

The cylindrical body has, on the opposite end of the flange, a transverse end wall separating it from the anchoring stem and through which the internal tube passes.

Said anchoring stem comprises at least a first duct and a second duct which are parallel to the axis of the cylindrical body, which may be formed through said circumferential groove and the peripheral rib, the ducts being positioned on either side of the internal tube.

The ducts open on the one hand into the circumferential groove, and possibly into the peripheral rib.

On the other hand, the ducts may open through said transverse end wall.

Injecting through a duct offset from the internal tube makes it possible to avoid curable substance becoming deposited on the internal tapped thread of said internal tube so as to avoid any contamination that would prevent the screw from being tightened after the curable substance has polymerized, or that would lead to it becoming impossible to unscrew the assembly.

According to one advantageous aspect, at least one of the ducts, preferably the first duct, is at least partially conical or frustoconical. The first duct is an injection duct via which the curable substance can be injected.

In particular, at least one of the ducts, preferably the first duct, may have a conical or frustoconical first portion and a cylindrical second portion. The conical or frustoconical first portion is formed at least in the cylindrical body of the insert. The cylindrical second portion is formed in the anchoring stem.

An injection duct such as this which is at least partially conical or frustoconical facilitates the insertion of a needle for injecting the curable substance, which is generally conical in shape. In addition, it offers better contact and makes it possible to guarantee sealing at the injection duct notably when the movement and positioning of the needle are automated. Specifically, when a robot sets the conical injection needle down, generally with a certain force, against the injection duct, if the latter is straight for example cylindrical, the needle will touch the edge corner of the injection duct, with a risk of damaging the needle and leading to a loss of sealing.

Furthermore, notably in the event of potential imprecision in the positioning of an industrial robot that is moving the needle, the conical shapes allow the centering of the needle with respect to the injection duct.

The second duct may or may not be identical to the first duct. The second duct may be at least partially conical or frustoconical.

As an alternative, the second duct may be cylindrical. The first duct and the second duct may have the same diameter.

As an alternative, the first duct and the second duct may have different diameters.

When the second duct has a diameter smaller than that of the first duct, that creates a restriction at the second duct which forms a vent duct, making it possible to slow the exit of the substance via this vent duct and avoid the inclusion of air.

Conversely, when the second duct has a diameter greater than that of the first duct, that would, for example if the viscosity of the substance injected were too high, rather facilitate the exiting of the substance via this vent duct.

The first duct and the second duct of said insert each have a diameter comprised between 1 and 3 mm.

The peripheral ribs and the circumferential grooves are interrupted by the first duct and the second duct and said ducts have radial openings toward the outside.

The radial openings of the peripheral ribs have a diameter comprised between 3 and 6 mm.

The semicircular transverse profiles of the circumferential groove and of the peripheral rib of the anchoring stem are interrupted by the at least one cut parallel to the axis of revolution and distant from the first duct and from the second duct of said anchoring stem.

Said insert is produced in a single piece.

As an alternative, said insert is produced in three pieces.

A first piece may comprise an insetting member with the cylindrical body and the anchoring stem separated from one another by the transverse end wall of the cylindrical body, the anchoring stem comprising an internal passage coaxial with the cylindrical body communicating with an internal hollow of oblong shape positioned in the end peripheral rib forming the free end of the anchoring stem, said hollow being accessible via an opening on the surface of said end peripheral rib.

A second piece may comprise the internal tube, said internal tube being secured to a transverse foot at one of its ends and being configured to be inserted into the internal passage of the anchoring stem, the foot being configured to be housed in the hollow of the end peripheral rib.

A third piece may comprise a cap configured to close said opening of the end peripheral rib.

Assembling an insert made in three pieces makes it possible to offer additional degrees of freedom in order to avoid any static indeterminacy during assembly.

The internal hollow has dimensions greater than the dimensions of the foot secured to the internal tube and the diameter of the internal passage is less than or equal to the width of the internal hollow and greater than the diameter of the internal tube, so as to allow additional degrees of freedom.

The opening on the surface of the end peripheral rib has an oblong shape with a lateral entrance allowing the cap to be inserted by sliding.

According to another aspect, the cylindrical body of the insert comprises a deformable peripheral wall.

The deformable peripheral wall may comprise at least one region of weakness or at least two points of weakness. That forms an initiator encouraging and localizing the deformation of the deformable peripheral wall.

The deformable peripheral wall of the cylindrical body of the insert may have at least two, preferably at least three, equidistant orifices. Said orifices are advantageously positioned in the one same plane perpendicular to the axis of revolution.

These equidistant orifices on the deformable peripheral wall form points of weakness that allow said wall to be collapsed at these points and guarantee that the deformation is localized to these orifices at the same time rather than only to one point on the wall haphazardly as could have occurred in the earlier solutions.

A further subject of the invention is an insert intended to be assembled in a hole in a sandwich panel, comprising a hollow cylindrical body having a flanged end deformable by a placement tool allowing mechanical connection by deformation with a surface skin of the sandwich panel, the insert comprising an anchoring stem in the continuation of the cylindrical body as well as a blind internal tube intended to collaborate with the placement tool, such that the anchoring stem has at least one circumferential groove and a peripheral rib, and comprises at least a first duct and a second duct which are parallel to the axis of the cylindrical body and positioned on each side of the internal tube opening into the circumferential groove, and possibly into the peripheral rib.

The ducts may potentially be formed through said circumferential groove and the peripheral rib.

The cylindrical body may have, at the opposite end from the flange, a transverse end wall separating it from the anchoring stem and through which the internal tube passes. The ducts open on each side through the transverse end wall.

At least one of the ducts, preferably the first duct, is at least partially conical or frustoconical. The first duct is the duct via which a curable substance can be injected.

In particular, at least one of the ducts, preferably the first duct, may have a conical or frustoconical first portion and a cylindrical second portion. The conical or frustoconical first portion is formed at least in the cylindrical body of the insert. The cylindrical second portion is formed in the anchoring stem.

The second duct may or may not be identical to the first duct.

The second duct may be at least partially conical or frustoconical. As an alternative, the second duct may be cylindrical.

The first duct and the second duct may have the same diameter.

As an alternative, the first duct and the second duct may have different diameters.

Another subject of the invention is a method for assembling an insert as described hereinabove, in a hole in a sandwich panel by means of a placement tool, wherein it comprises the following successive steps:
- the insert is positioned by axial pressing in the hole previously formed in the sandwich panel,
- axial pressure is applied to the flared flanged end of the insert using an end piece of the placement tool to cause the flared flanged end of the insert to penetrate the surface skin of the sandwich panel, and at the same time the internal tube is pulled using the placement tool so as to deform a deformable peripheral wall of the cylindrical body of the insert and form a first region of mechanical connection between the insert and the sandwich panel so that, at the end of fitting, the flanged end of the insert and the end of the internal tube come flush with the surface of the sandwich panel,
- a curable substance is injected via the opening and through the first duct of the anchoring stem,
- injection is interrupted when the curable substance is detected in the second duct in the vicinity of the end wall of the cylindrical body.

BRIEF DESCRIPTION OF THE SEVERAL VIEWS OF THE DRAWINGS

Another subject of the invention is an assembly comprising an insert as described hereinabove and a sandwich panel.

Further features and advantages of the invention will become more clearly apparent from reading the following description, given by way of illustrative and nonlimiting example, with reference to the attached figures in which:

FIG. 12C is a schematic view in transverse section of the placement tool positioned, with the insert, in the hole in the sandwich panel, FIG. 12D is a schematic view in transverse section of the mechanical deformation of the insert by the placement tool, FIG. 12E is a schematic view in transverse section of the insert assembled in the hole in a sandwich panel after the injection of a curable substance, FIG. 12F is a schematic view in transverse section of an assembly of an element pressed against the sandwich panel by a screw collaborating with the internal tube of said insert, FIG. 13a is a perspective view of an alternative form of the insert having a predefined number of orifices on a deformable peripheral wall of a cylindrical body of the insert prior to crimping, FIG. 13b is a view in section of the insert of FIG. 13a, after crimping, FIG. 14 is a view in transverse section of an alternative form of the insert comprising partially frustoconical offset ducts.

DETAILED DESCRIPTION OF THE INVENTION

Elements that are identical in the various figures bear the same numerical references.

The following embodiments are examples. Although the description refers to one or more embodiments, that does not necessarily mean that each reference relates to the same embodiment or that the features apply only to one single embodiment. Simple features of various embodiments can also be combined and/or interchanged to form other embodiments.

Certain elements, such as for example first, second element may be indexed in the description. This is simple indexing to differentiate between and to name elements that are similar but not identical. This indexing does not necessarily imply that one element has priority over another, and such namings may easily be interchanged without departing from the scope of the present invention. Neither does this indexing necessarily imply an order in time.

In the figures of the present invention, the core of the sandwich panel depicted in said figures has a honeycomb structure, this structure is given by way of example and nonexhaustively. The insert according to the invention also being configured to be assembled in a sandwich panel having a foamed structure obtained from various compounds such as polyurethane, polyester adhesive, epoxy adhesive or else a metal foam made up of aluminum.

Figure 1:
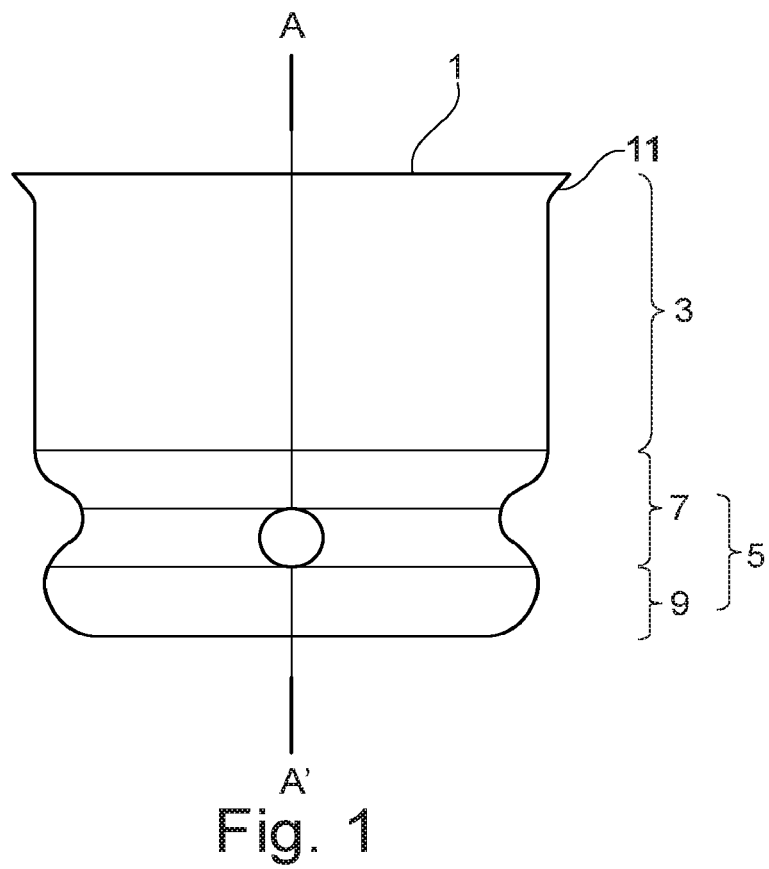
FIG. 1 depicts a perspective view of the insert according to the invention.

The insert 1 depicted in FIG. 1 comprises a cylindrical body 3 which is surmounted by a flared flanged end 11 and which is extended at the other end by an anchoring stem 5. The cylindrical body 3 has an axis of revolution A-A' (visible in FIG. 1).

The insert 1 is made as a single piece in a metallic material offering a good compromise between the cost of the component and good mechanical properties notably in terms of integrity. The material may for example be an aluminum alloy.

Figure 2:
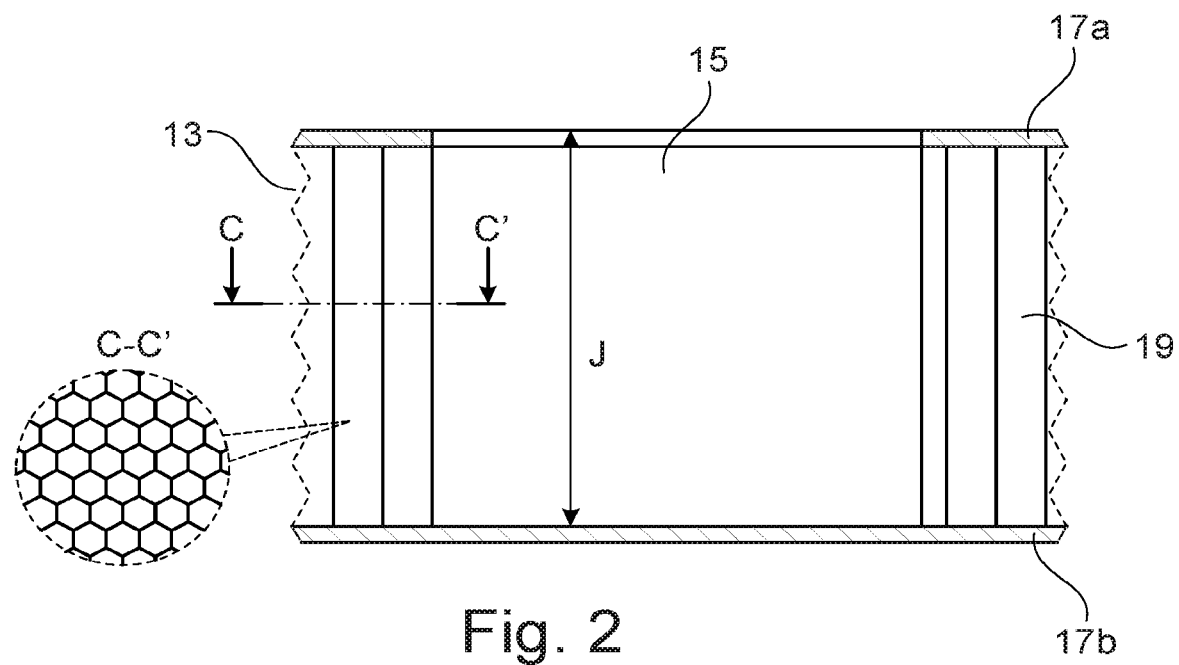
FIG. 2 is a schematic view in transverse section of a sandwich panel comprising a hole.

The insert 1 is intended to be inserted into a hole 15 formed beforehand in a sandwich panel 13, as depicted in FIG. 2, so as to be able to attach an element 115 to the sandwich panel 13. One example of an element 115 produced in the form of a sheet is depicted in FIG. 12F.

In this FIG. 2, the sandwich panel 13 comprises by way of example a honeycomb core 19. The honeycomb core 19 illustrated in this FIG. 2 is interposed between two skins, one skin referred to as the surface skin 17a and a skin referred to as the bottom skin 17b. The honeycombs, comparable to the cellular structure formed by a bee, are made for example of aluminum or of paper board or of synthetic plastic, according to the desired bending strength and desired capacity for deformation. The skins 17a and 17b on either side of the honeycomb core 19 are formed, for example, from resin and glass fiber and it is these that give the sandwich panel 13 its mechanical strength.

The depth J (indicated in FIG. 3) of the hole 15 formed in the sandwich panel 13 corresponds for example to the thickness comprising the honeycomb core 19 and the surface skin 17a of the sandwich panel 13. The hole 15 produced is a blind hole, which means to say does not pass all the way through. Furthermore, the hole 15 has a diameter substantially equal to the diameter of the cylindrical body 3 of the insert 1 so that the insert 1 is fitted tightly into the hole 15 in the sandwich panel 13, as depicted in FIG. 3.

Figure 3:
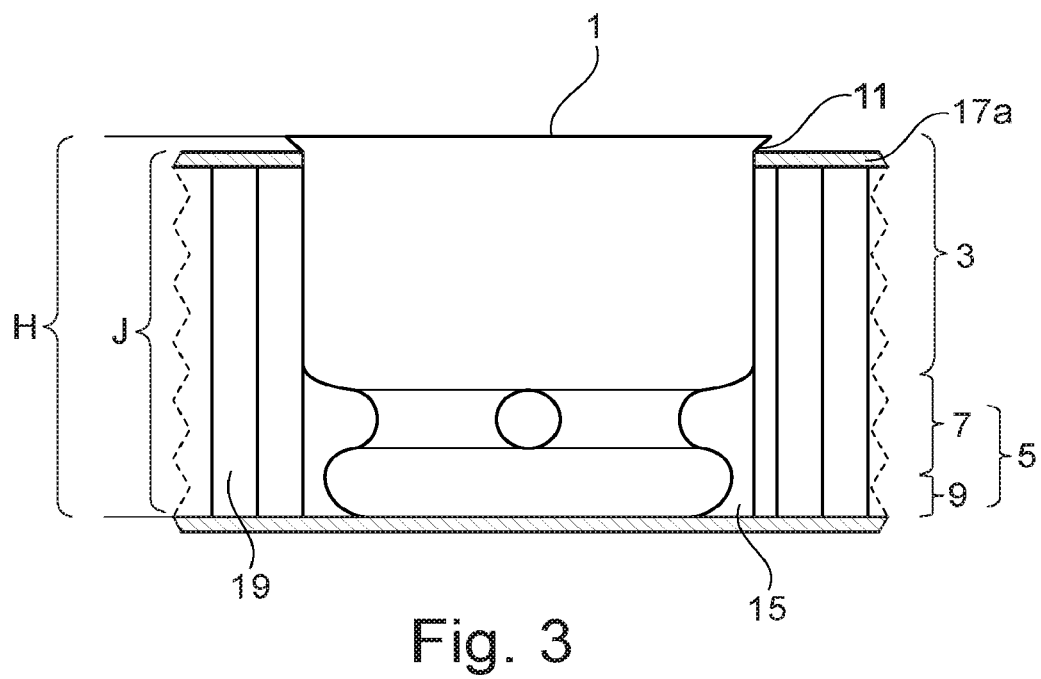
FIG. 3 is a schematic view in transverse section of the insert of FIG. 1 positioned in the hole in the sandwich panel of FIG. 2 during an assembly method.

As can be seen in FIG. 3, the total height H of the insert 1 extending from the flared flanged end 11 to the end of the anchoring stem 5 situated on the opposite side, is chosen for example so that when the insert 1 is positioned in the hole 15 in the sandwich panel 13 only the flared flanged end 11 protrudes from the surface skin 17a of the sandwich panel 13. The total height H of the insert 1 is greater than the depth J of the hole 15 formed in the sandwich panel 13.

Figure 4A:
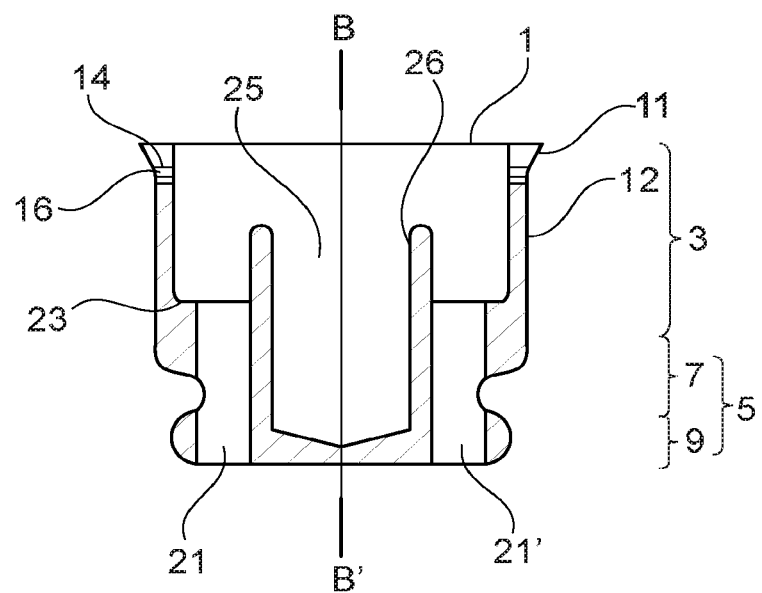
FIG. 4A is a view in transverse section on the plane of section B-B' of the insert according to FIG. 1.
Figure 4B:
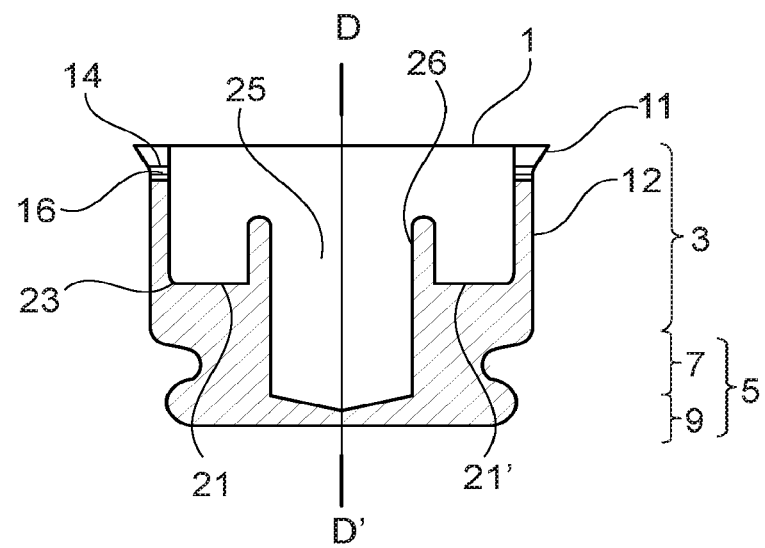
FIG. 4B is a view in transverse section on the plane of section D-D' of the insert according to FIG. 1.
Figure 5:
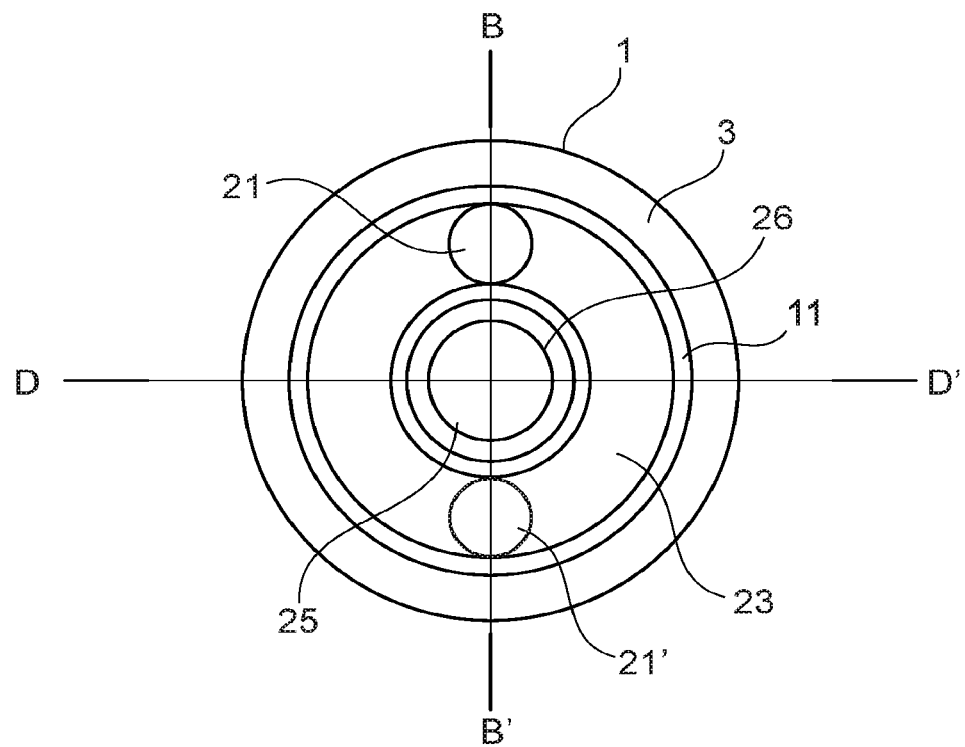
FIG. 5 is a schematic view in longitudinal section of the cylindrical body of the insert according to FIG. 1.

FIG. 4A and FIG. 4B are schematic views in transverse section on planes of section B-B' and D-D' respectively, of the insert 1 (visible in FIG. 5).

As can be seen in FIGS. 4A and 4B, the cylindrical body 3 is hollow whereas the anchoring stem 5 in the continuation of said cylindrical body 3 is full of the material of which the insert 1 is made. The cylindrical body 3 has a transverse end wall 23 at the opposite end to the flange 11, separating said cylindrical body 3 from the anchoring stem 5.

As can best be seen in FIGS. 4A and 4B which show perpendicular planes of section, the cylindrical body 3 of the insert 1 comprises a transverse end wall 23 parallel to the flange 11 and a cylindrical deformable peripheral wall 12. An internal tube 25 projects from the transverse end wall 23 inside the deformable peripheral wall 12. The internal tube 25, the cylindrical body 3 and the anchoring stem 5 are coaxial.

The internal tube 25 passes through the transverse end wall 23 of the cylindrical body 3 and the anchoring stem 5. In the example described, the blind internal tube 25 does not pass fully through the anchoring stem 5.

The anchoring stem 5 of the insert 1 which stem is illustrated in FIGS. 4A and 4B, comprises at least one circumferential groove 7 and at least one peripheral rib 9.

The circumferential groove 7 and the peripheral rib 9 each have a rounded transverse profile, particularly semicircular transverse profiles softening the transverse profile of the insert 1.

The circumferential groove 7 and the peripheral rib 9 of said anchoring stem 5 make up the free end of the insert 1. This free end of the insert 1 is configured to be able to collaborate with a curable substance 111 when it is injected into the hole 15 in the sandwich panel 13 (visible in FIGS. 12E and 12F).

The rounded profiles of the circumferential groove 7 and of the peripheral rib 9 soften the contour of the anchoring stem 5 so as to limit stress concentrations in the curable substance 111 injected between the free end of the insert 1 and the hole 15 in the sandwich panel (visible in FIGS. 12E and 12F) so as to avoid the appearance of cracks, which are sources of breakage in the curable substance 111. The softened shape of the contour of the free end of the insert 1 also makes it possible to increase the degree to which it collaborates with the curable substance 111 injected into the hole 15 in the sandwich panel 13, in the face of the various mechanical stresses experienced by the assembly. The rounded shape of the anchoring stem 5 gives the insert 1 assembled in the sandwich panel 13 a pull-out strength of between 1500 and 3000 Newtons.

The anchoring stem 5, in the continuation of the cylindrical body 3, has a cylindrical overall shape.

The at least one circumferential groove 7 of this anchoring stem 5 of cylindrical overall shape has a rounded end wall. Thus, the anchoring stem 5, because of its rounded shape, has a load-spreading surface or bearing surface that is increased in comparison with sharp-edged contours notably of the fir tree type.

The diameter of the anchoring stem 5 at the peripheral rib 9 is less than or equal to the diameter of the cylindrical body 3, this making it possible to obtain a stable and tight fit of the insert 1 in the hole 15 in the sandwich panel 13. This difference in diameter allows cohesion of the curable substance 111 with the accessible softened lateral walls of the peripheral rib 9.

The transverse profiles of the circumferential groove 7 and of the peripheral rib 9 succeed one another continuously without abrupt transition, this being for the purpose of avoiding any roughness on the contour of the anchoring stem 5.

The insert 1 is for example configured so that only the portion of the deformable peripheral wall 12 comprised between an open end 26 of the internal tube 25, situated on the opposite side to the anchoring stem 5, and the flared flanged end 11 of the insert 1 deforms upon assembly with the sandwich panel 13.

The deformable peripheral wall 12 may further comprise at least one region of weakness 14 (depicted in FIGS. 4A, 4B, 7 and 12E to 12F). The region of weakness 14 forms an initiator encouraging and localizing the deformation of the deformable peripheral wall 12.

The region of weakness 14 is for example formed by an at least partially continuous slot 16 in the internal circumference of the deformable peripheral wall 12, of a depth for example comprised between 0.1 and 0.3 mm.

As an alternative, the deformable peripheral wall 12 may comprise a predefined number of points of weakness uniformly angularly distributed.

According to an alternative form illustrated in FIG. 13a, the deformable peripheral wall 12 has at least two, preferably at least three, orifices 140. In the nonlimiting example of FIG. 13a, four orifices 140 forming points of weakness are depicted.

The orifices 140 formed on the deformable peripheral wall 12 are equidistant.

In other words, these orifices 140 are uniformly angularly distributed. For example, it is possible to provide two diametrically opposed orifices 140, three orifices 140 every 120°, four orifices 140 every 90°, and so on.

In addition, the orifices 140 are advantageously positioned on the deformable peripheral wall 12 in the one sample plane perpendicular to the axis of revolution A-A' of the cylindrical body. All the orifices 140 are therefore positioned at the same height along the axis of revolution A-A'. In the example of FIG. 13, the orifices 140 are positioned close to and the same distance away from the flared flanged end 11.

The orifices 140 are produced identically. The diameter of such orifices 140 may be adapted to suit the requirements and the stresses.

Such orifices 140 make it possible to avoid, when deforming the deformable peripheral wall 12 to form the crimping (as shown in FIG. 13B), this deformation occurring randomly and thus makes it possible to avoid potential problems of the perpendicularity of the insert 1 which might stem from random crimping. Such crimping, that causes the deformable peripheral wall 12 to form an annular radial bulge 107 behind the flared flanged end 11 of the insert 1 that penetrates the surface skin of the sandwich panel, is described in greater detail hereinafter. In FIG. 13B, the surface skin of the sandwich panel has been removed to make this figure easier to study and to understand.

The distance between the internal tube 25 and the flared flanged end 11 of the undeformed insert 1 is dimensioned so that when assembled in the hole 15 in the sandwich panel 13, as depicted later on in FIG. 12E, the internal tube 25 lies flush with the flared flanged end 11 of the insert 1.

The flared flanged end 11 has a frustoconical annular shape that facilitates the penetration of the insert 1 into the surface skin 17a of the sandwich panel 13.

According to FIG. 4A, the anchoring stem 5 of the insert 1 comprises at least a first 21 duct and a second 21' duct which are parallel to the axis of revolution of the cylindrical body 3 (the axis A-A'). Said first 21 and second 21' ducts are created for example by drilling. They may be formed through the circumferential groove 7 and the peripheral rib 9.

Said ducts 21 and 21' open into the circumferential groove 7 and through the peripheral rib 9.

Figure 16:
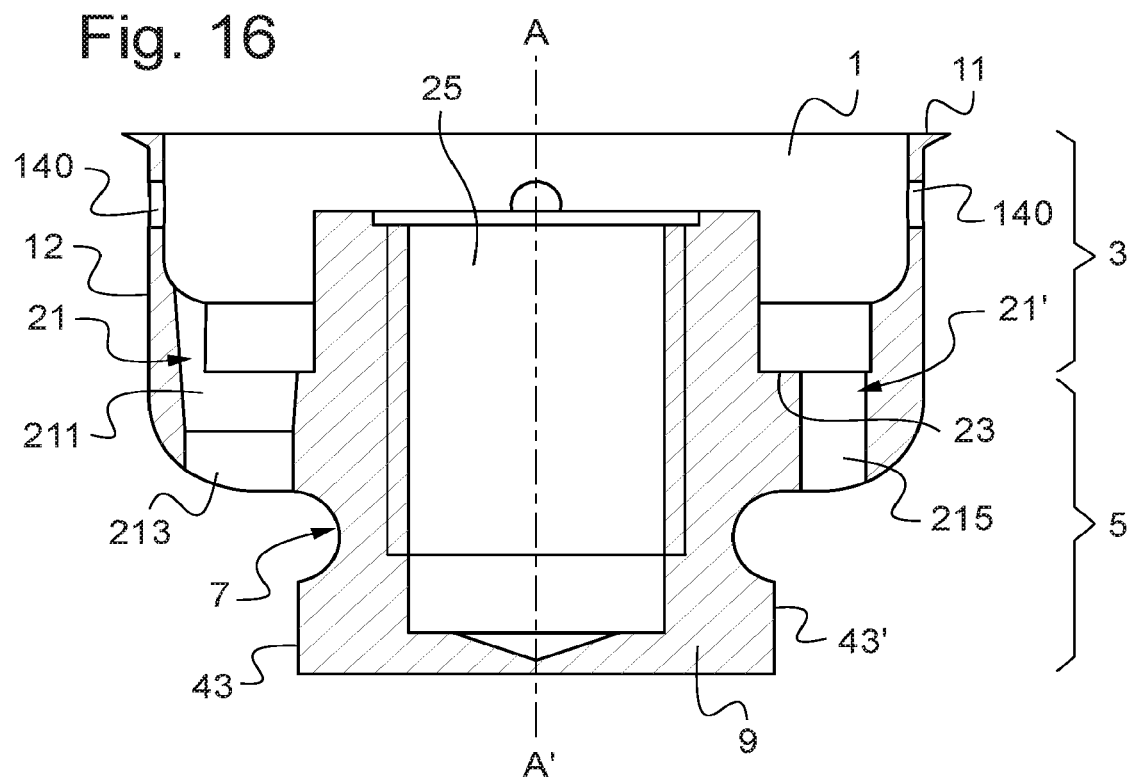
FIG. 16 is a view in transverse section of the alternative form of the insert of FIG. 15.

According to another alternative, the ducts 21, 21' may open into the circumferential groove 7 without being formed through the circumferential groove 7 and the peripheral rib 9 (as schematically indicated in the examples of FIGS. 13b, 14 and 16).

The first duct 21 and the second duct 21' are accessible through the transverse end wall 23 of the hollow cylindrical body 3.

The internal tube 25 is a blind tube which makes it possible to avoid unwanted application of curable substance 111 to the tapped internal thread 25A during assembly with the sandwich panel 13 and makes it possible to obtain a good connection between the insert 1 and the screw 113 (visible in FIG. 12F). The internal tube 25 has an open end 26, the opposite end to the blind end, accessible from the cylindrical body 3.

As can best be seen in FIG. 5, the ducts 21 and 21' are positioned on either side of the internal tube 25 so as to allow air compressed in the hole 15 in the sandwich panel 13 (these are visible in FIG. 2) during the filling with curable substance 111 to be expelled from a gap 109 depicted later on in FIG. 12D, between the insert 1 and the bottom of the hole 15 in the sandwich panel 13. In this FIG. 5, the circumference of the cylindrical body 3 and the circumference of the flared flange 11 are visible, as is the transverse end wall 23 through which the first and second ducts 21 and 21' and the internal tube 25 pass. The peripheral rib 9 of the anchoring stem 5, which has a diameter less than or equal to the diameter of the cylindrical body 3, is therefore not visible in FIG. 5.

Said ducts 21 and 21' in the anchoring stem 5 each have a diameter comprised between 1 and 3 millimeters.

The first duct 21 is configured to accept an end piece of an injection needle 41 depicted later on in FIG. 12E. The first duct 21 is also referred to as the injection duct.

During placement of the insert 1, a surplus of the curable substance 111 injected may re-emerge via the second duct 21', which also acts as a vent duct.

Figure 6:
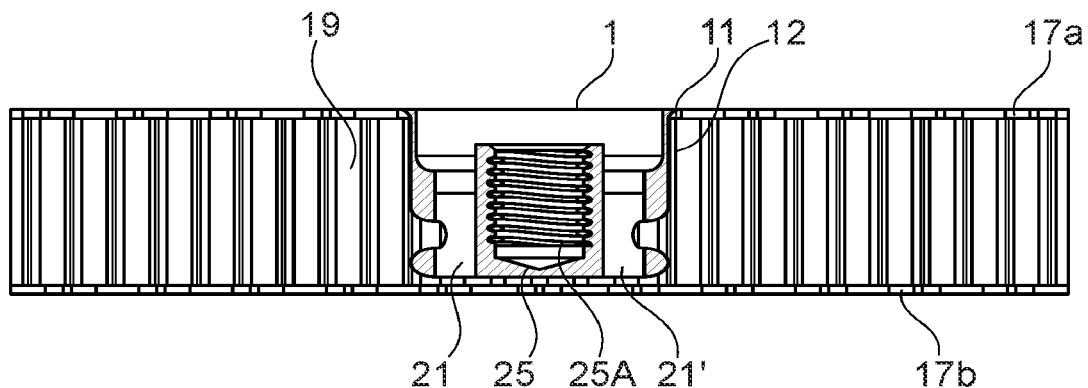
FIG. 6 is a view in transverse section of a tapped insert according to FIG. 1 assembled in a sandwich panel.

As may be seen in FIG. 6, the tapped thread 25A of the internal tube 25 allows collaboration with a placement tool 101 (visible in FIGS. 12C and 12D) used for assembling the insert 1 in the hole 15 in the sandwich panel 13. The internal tapped thread 25A is also configured to collaborate with a fastener such as a screw 113 (visible in FIG. 12F) designed to attach an element 115 (also visible in FIG. 12F) to the sandwich panel 13.

Figure 7:
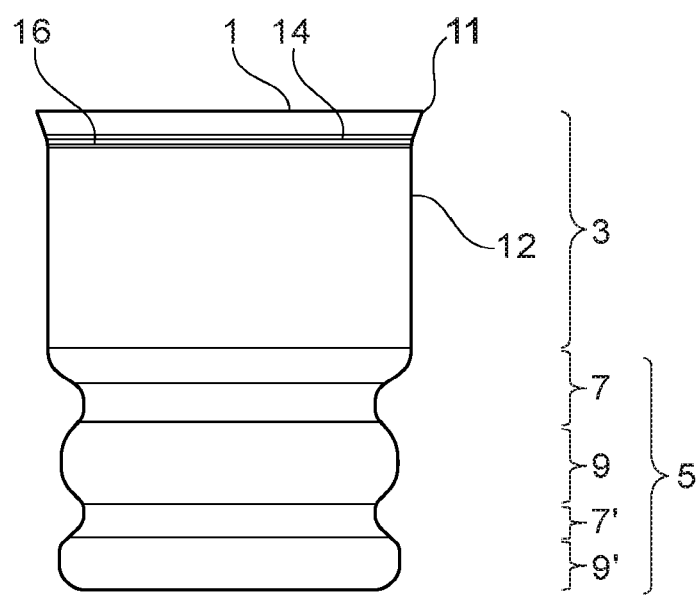
FIG. 7 is a view in transverse section of a first embodiment of an insert according to the invention.

According to a first embodiment of the insert 1, depicted in FIG. 7, the insert 1 comprises two circumferential grooves 7 and two peripheral ribs 9 succeeding one another in alternation. This alternation makes it possible to improve the collaboration between the anchoring stem 5 and the curable substance 111 in the hole 15 in the sandwich panel 13 once the insert 1 has been assembled into said hole 15. The number of circumferential grooves 7 and the number of peripheral ribs 9, just like the thickness thereof, are chosen according to the depth J of the hole 15 in the sandwich panel 13 in which the insert 1 is assembled.

Figure 8A:
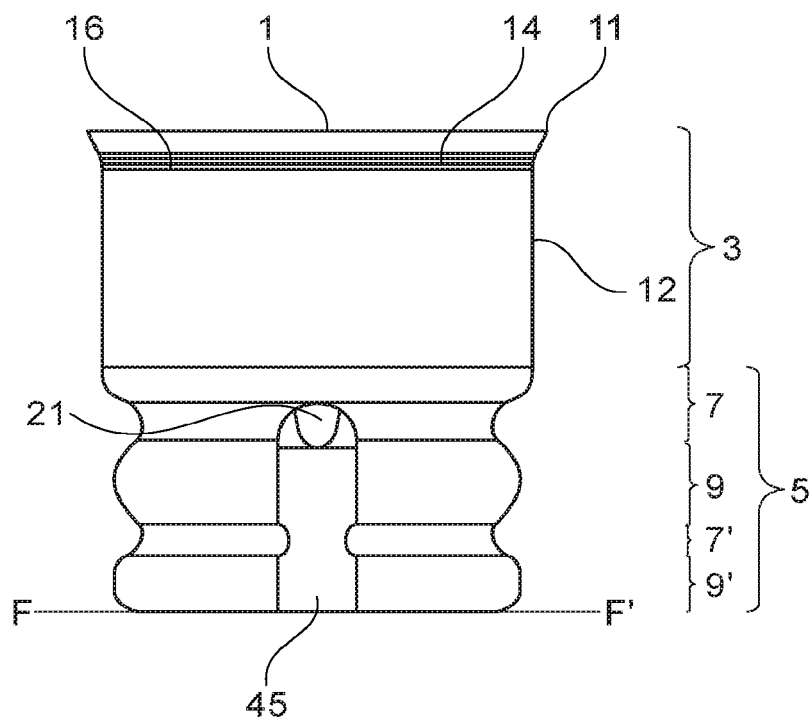
FIG. 8A is a view in transverse section of a second embodiment of an insert according to the invention.
Figure 8B:
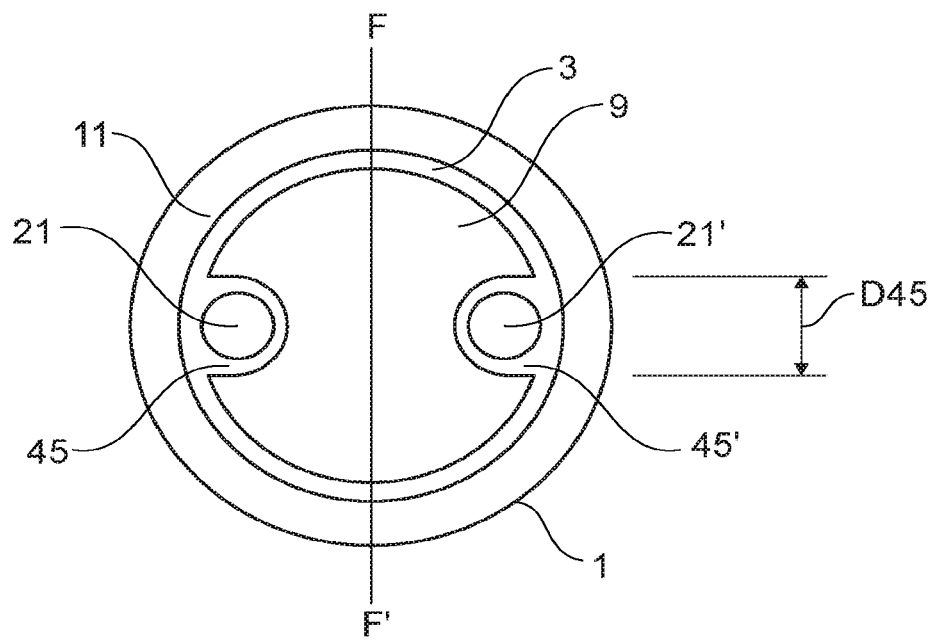
FIG. 8B is a view on the plane of transverse section F-F' of the peripheral rib of an insert according to the second embodiment.

In a second embodiment of the insert 1, depicted in FIG. 8A, the peripheral ribs 9 and 9' and the circumferential grooves 7 and 7' of the anchoring stem 5 of said insert 1 are interrupted by the first duct 21 and the second 21' duct so that said first and second ducts 21 and 21' are open radially toward the outside at radial openings 45 and 45'. The radial openings 45 and 45' are illustrated in FIG. 8B in the transverse plane of section F-F' of FIG. 8A. Said radial openings 45 and 45' have a diameter D45 comprised between 3 and 6 mm, encouraging the passage of curable substance 111 between the insert 1 and the hole 15 in the sandwich panel 13. In addition, the radial openings 45 and 45' of the first and second ducts 21 and 21' make it possible to prevent the insert 1 from rotating once it is assembled in said hole 15 in the sandwich panel 13.

The second duct 21' may or may not be identical to the first duct 21.

According to one advantageous aspect, at least one of the ducts is at least partially conical or frustoconical. As a preference, at least the first duct 21 is at least partially conical or frustoconical.

According to one embodiment illustrated in FIG. 14, the two ducts 21 and 21' are at least partially conical or frustoconical.

More specifically, the ducts 21, 21' may respectively have a conical or frustoconical first portion 211 and a cylindrical second portion 213.

The frustoconical first portion 211 is formed at least in the cylindrical body 3. It may also be formed partially in the anchoring stem 5 beyond the transverse end wall 23. The cylindrical second portion 213 for its part is formed in the anchoring stem 5 in the continuity of the frustoconical first portion 211.

The ducts 21, 21' may be produced by drilling that is conical or frustoconical at the start to form the frustoconical first portion 211, then straight drilling at the end in the anchoring stem 5, to form the cylindrical second portion 213.

The conical or frustoconical shape of the injection duct 21 in particular, at least at the cylindrical body 3 of the insert 1, facilitates the positioning and centering of the injection needle, ensures better contact and avoids damaging this needle, particularly in the event of automation, as such damage would carry the risk of impairing the sealing.

In the example of FIG. 14, the two ducts 21, 21' are identical, having the same shape and the same diameter, offering ease of machining and cost savings.

As an alternative, the ducts 21, 21' may have different diameters.

Figure 15:
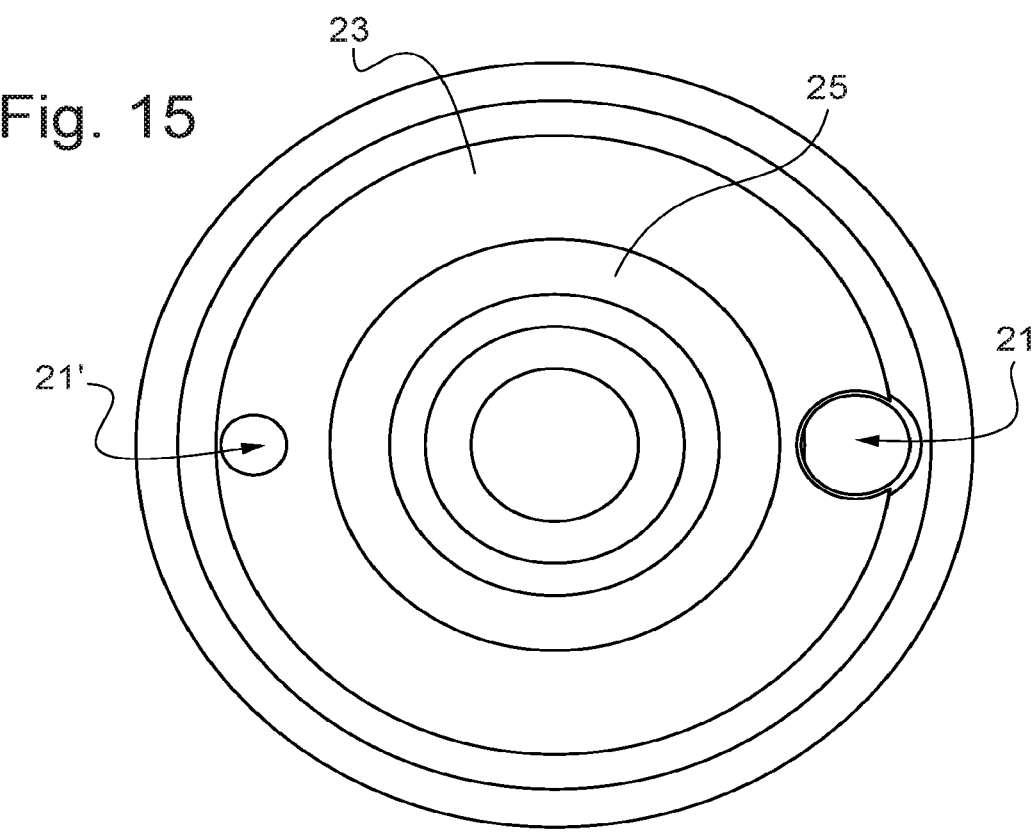
FIG. 15 is a view from above of another alternative form of the insert comprising different offset ducts.

According to one embodiment depicted in FIGS. 15 and 16, the two ducts 21 and 21' are not identical and may have different diameters.

The first duct 21 may be identical to the example in FIG. 14 and is not described again. The second duct 21' may be of some shape other than conical or frustoconical.

The second duct 21' is, for example, cylindrical. It may have a single cylindrical portion 215 produced, for example, by straight, non-countersunk drilling.

The second duct 21' has a diameter smaller than that of the first duct 21, particularly than the minimum diameter of the frustoconical shape or portion 211, which here corresponds to the diameter of the cylindrical portion 213 of the first duct 21. By way of example, the minimum diameter of the first duct 21 may be between 2 mm and 3 mm, while the diameter of the second duct 21' may be less than 2 mm.

That creates a restriction making it possible to slow the flow of the curable substance such as adhesive, so that a higher pressure can be exerted within the panel, encouraging this curable substance to spread out and avoiding inclusions of air. In other words, this restriction generates a plug that prevents the curable substance such as adhesive from coming back up the other side too soon to exit via the second duct 21' before having had the chance to spread over the entire periphery of the insert 1.

Conversely, according to an alternative form that has not been illustrated, the second duct 21' may have a diameter greater than that of the first duct 21, particularly than the maximum diameter of the frustoconical shape, in order on the other hand to prevent such plugging and facilitate the ability of the curable substance to come back up through the second duct 21', something which may be advantageous notably when the curable substance has a high viscosity.

Furthermore, in the examples of FIGS. 14 and 16, the ducts 21 and 21' are not formed through the circumferential groove 7 and the peripheral rib 9. Such an alternative form which is not depicted is also conceivable and applicable to the embodiment with the ducts 21 and 21' of which at least one is frustoconical, in a similar way to the examples described with reference to FIGS. 4A, 6, 8A, 10A, 12B to 12F.

Finally, the description of the ducts 21 and 21' is given in relation to an anchoring stem 5 the contours of which are rounded as described hereinabove and illustrated in the figures. Of course, the description of the offset ducts 21 and 21', of which at least one is advantageously frustoconical, applies equally to an alternative form (not depicted) of insert the anchoring stem of which has at least one roughness in order to be able to collaborate with the curable substance, comprising for example, at least one frustoconical tooth, such that the anchoring stem has the shape of a fir tree.

Figure 9:
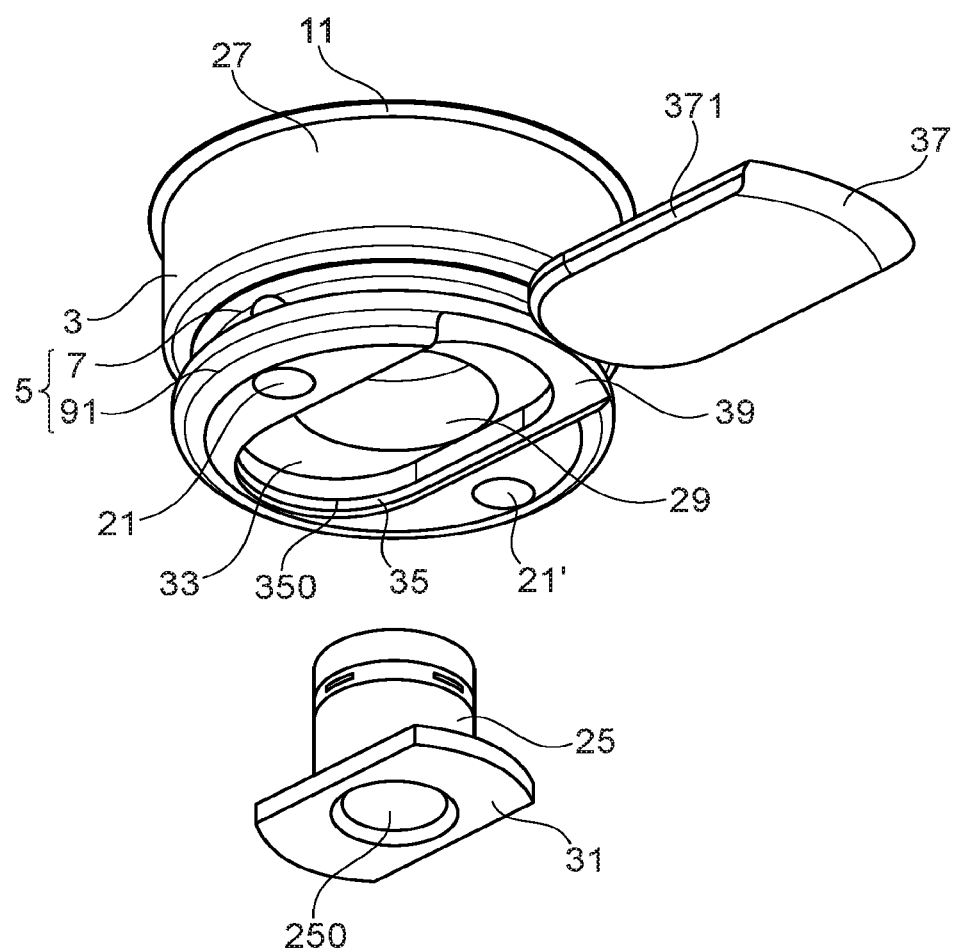
FIG. 9 is a three-dimensional diagram of a "three-piece" insert according to a third embodiment.

According to a third embodiment of the insert 1 illustrated in FIG. 9, said insert 1 according to the invention comprises three pieces assembled with one another, comprising an insetting member 27, an internal tube 25 and a cap 37. Said "three-piece" insert 1 may be produced for example in steel. The so-called "three-piece" insert 1 according to this third embodiment is depicted in FIG. 9.

The insetting member 27 is intended to be assembled into the hole 15 in the sandwich panel 13 (depicted later on in FIGS. 10A and 10B) and comprises the cylindrical body 3 and the anchoring stem 5 which are separated from one another by the transverse end wall 23 of said cylindrical body 3. The anchoring stem 5 comprises an internal passage 29 coaxial with the cylindrical body 3 and communicating with an internal hollow 33 of oblong shape positioned in the free end of the anchoring stem 5 referred to as the end peripheral rib 91. The internal hollow 33 is accessible through an opening 35 of oblong shape and present on the surface of the end peripheral rib 91.

The opening 35 in the end peripheral rib 91 is configured to be able to insert the second piece of the "three-piece" insert 1 on the one hand into the internal hollow 33 of the peripheral rib 91 and on the other hand into the internal passage 29 of the anchoring stem 5.

The internal tube 25 is secured to a transverse foot 31 at one of its ends. The internal tube 25 is configured to be inserted into the internal passage 29 of the anchoring stem 5 and the transverse foot 31 is configured to be housed in the internal hollow 33 of the end peripheral rib 91. The transverse foot 31 makes it possible to limit the movements of the internal tube 25 when it is inserted in the internal passage 29. Said transverse foot 31 has an orifice 250 on its surface, allowing access to the internal tube 25 visible in FIG. 9.

In this same FIG. 9, the internal tube 25 has, for example on its external surface, two deformation points referred to as "punch points" 28 and 28', which are obtained by punching said internal tube 25. The deformations 28 and 28' thus created on said internal tube 25 allow the tapped thread 25A to be deformed inside the internal tube 25 thus forming a mechanical thread lock to prevent the screw or the threaded shank 113 collaborating with the insert 1 (illustrated in FIG. 12F) from working loose according to the "three-piece" embodiment.

The cap 37 is configured to close the opening 35 on the surface of the end peripheral rib 91. Said cap 37 allows the internal tube 25 secured to the foot 31 to be trapped inside the anchoring stem 5. In the embodiment, the cap 37 is of oblong shape and can be made of plastic or of an aluminum alloy or even from the same metallic material as used for the insetting member 27.

The transverse foot 31 has dimensions smaller than the dimensions of the internal hollow 33 so that the fit is not a tight one, the purpose of this being to allow the assembly a certain additional degree of freedom.

The insert 1 according to the three-piece embodiment is comparable to a "floating" insert making it possible to avoid static indeterminacy when fitting into the hole 15 in the sandwich panel 13.

The cap 37 has an oblong shape corresponding to the opening 35 of the end peripheral rib 91. The opening 35 has a lateral entrance 39 allowing said cap 37 to be inserted in the region of one of the rounded corners of said opening 35.

This same opening 35 comprises circumferential guide edges 350 of a shape that complements the peripheral edging 371 of the cap 37. The complementing nature of the shapes of the circumferential guide edges 350 and the peripheral edging 371 allows the cap 37 to slide in the opening 35 through the lateral entrance 39.

The closing of the opening 35 by the sliding of the cap 37 now illustrated in FIG. 9, is offered solely by way of nonlimiting example. The way in which the cap 37 is arranged over the opening 35 could be achieved by any other means, such as using clips for example.

Figure 10A:
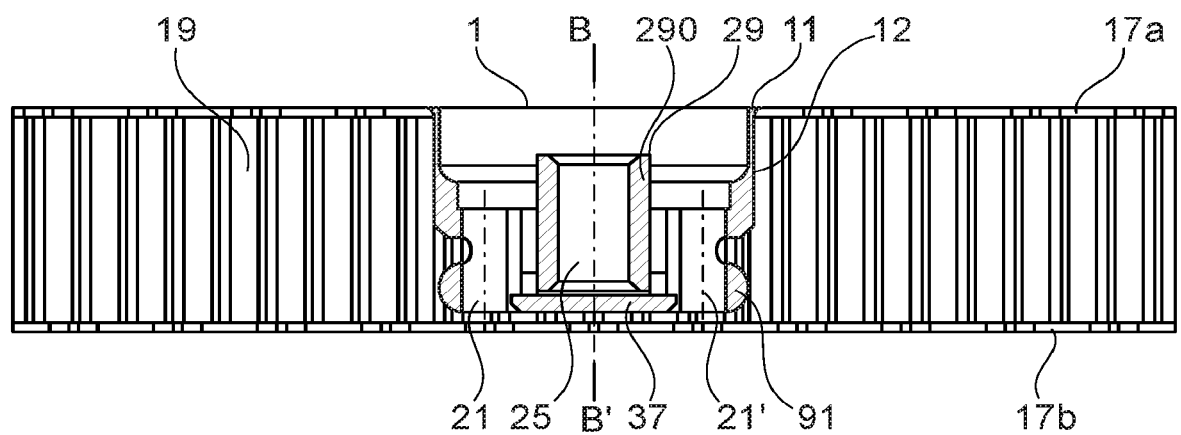
FIG. 10A is a view in transverse section on the plane of section B-B' of a "three-piece" insert assembled in a hole in a sandwich panel.
Figure 10B:
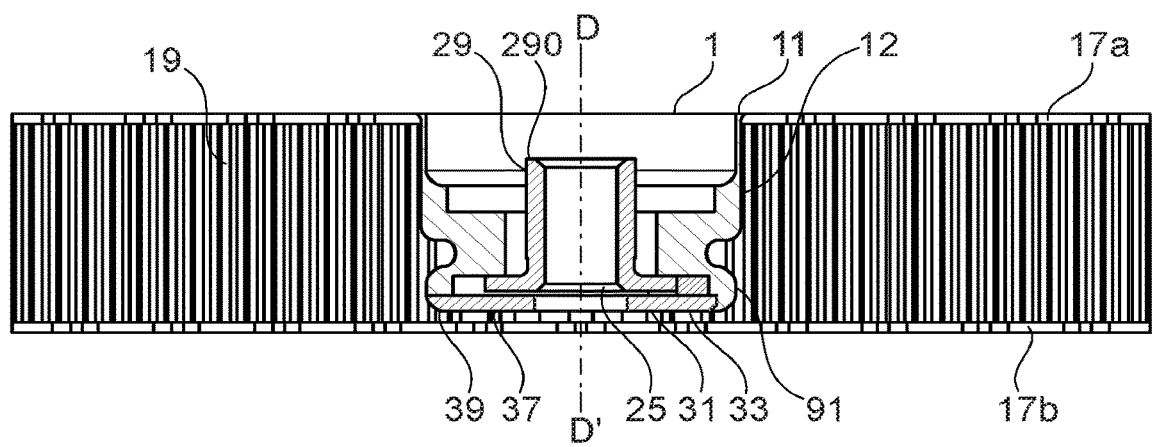
FIG. 10B is a view in transverse section on the plane of section D-D' of a "three-piece" insert assembled in a hole in a sandwich panel.

The assembling of the "three-piece" insert 1 in the hole 15 in a sandwich panel 13 is illustrated in FIGS. 10A and 10B. FIGS. 10A and 10B depict views in transverse section of the "three-piece" insert 1 assembled in the hole 15 in a sandwich panel 13, in the planes of section B-B' and D-D', respectively. In these FIGS. 10A and 10B, the cap 37 closes the opening 35 of the end peripheral rib 91 to allow the internal tube 25 to be trapped inside the internal passage 29. The internal passage 29 has dimensions greater than those of the internal tube 25 and assembly makes it possible to obtain additional degrees of freedom and avoids static indeterminacy when the insert 1 is mounted in the hole 15 in a sandwich panel 13.

In FIG. 10A, the walls of the first 21 duct and of the second 21' duct of the anchoring stem 5 are visible, as is the cap 37 in the direction of its width. The transverse foot 31 secured to the internal tube 25 is not visible in this figure.

Conversely, in FIG. 10B, the walls of the first 21 duct and the second 21' duct of the anchoring stem 5 are not visible. In this figure, the transverse foot 31 secured to the internal tube 25 is visible as is the cap 37, but in the direction of its length. This FIG. 10B also provides a glimpse of the lateral entrance 39 via which the cap 37 has been introduced by sliding in the opening 35.

In these FIGS. 10A and 10B, the internal tube 25 and its internal tapped thread 25A are accessible from the hollow of the cylindrical body 3.

Figure 11:
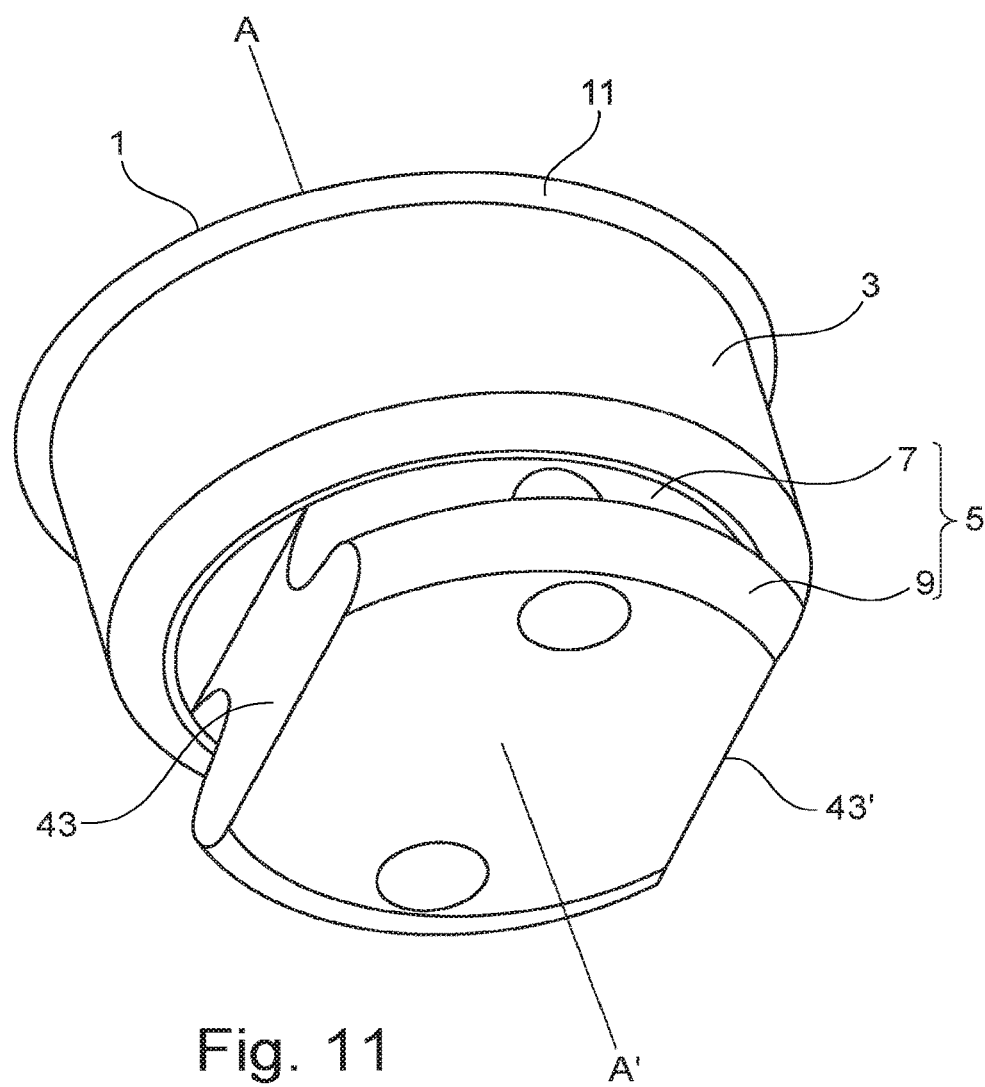
FIG. 11 is a three-dimensional diagram of a fourth embodiment of an insert according to the invention.

According to a fourth embodiment illustrated in FIG. 11, the semicircular transverse profiles of the circumferential groove 7 and the peripheral rib 9 of the anchoring stem 5 are interrupted by at least one cut 43, parallel to the axis of revolution A-A' of the insert 1.

In the example of FIG. 11, the cut 43 is obtained for example by milling the anchoring stem 5 in a cutting plane parallel to a plane defined by the first duct 21 and the second duct 21'. Said cut 43 is distant from said plane defined by the first duct 21 and the second duct 21', so as to allow the anchoring stem 5 to maintain a rounded circumference significant enough to be able to collaborate with the curable substance 111 and prevent stress concentrations leading to cracks in this same curable substance 111.

For example, two diametrically opposite cuts 43, 43' may be provided. The second cut 43' is produced in a similar way to the first cut 43.

According to an alternative form visible in FIGS. 14 and 16, the cut or cuts 43, 43' are obtained along a cutting plane perpendicular to the plane defined by the first duct 21 and the second duct 21'.

In addition, according to one or other of these alternative forms, the cut 43, 43' makes it possible to prevent the insert 1 from rotating once it is assembled in the hole 15 in a sandwich panel 13 then filled with curable substance 111. The cut or cuts 43, 43' thus form rotation-proofing flats or facets.

The various steps in the method of assembling the insert 1 according to the invention in a sandwich panel 13 will now be described with reference to FIGS. 12A, 12B, 12C, 12D, 12E, 12F.

Figure 12A:
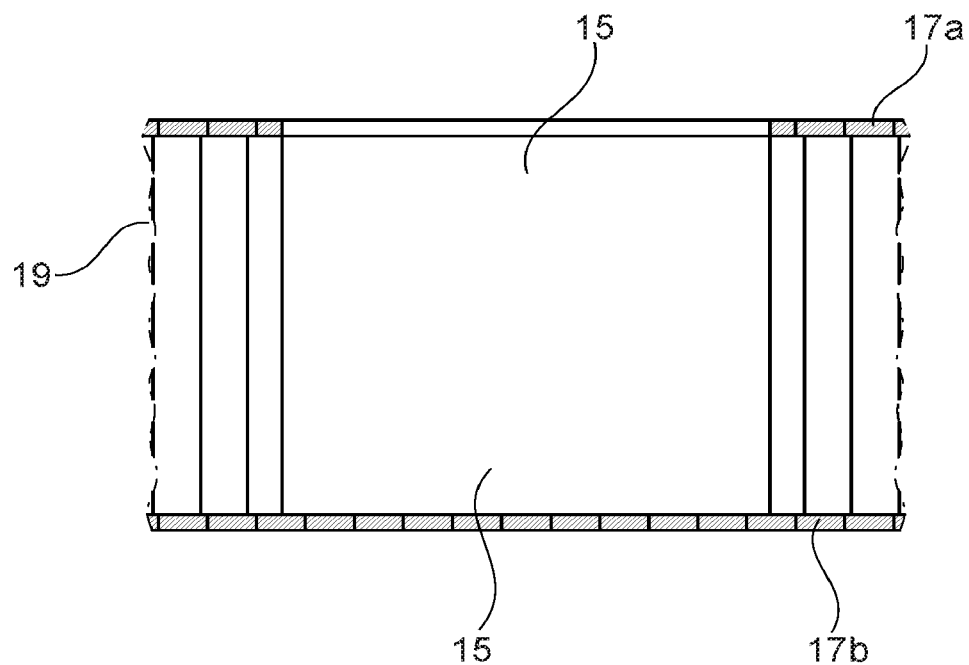
FIG. 12A is a schematic view in transverse section of the hole in the sandwich panel.

In a first step, a non-emerging hole 15 is formed in the sandwich panel 13 with a diameter corresponding to the diameter of the cylindrical body 3 of the insert 1 (FIG. 12A).

Figure 12B:
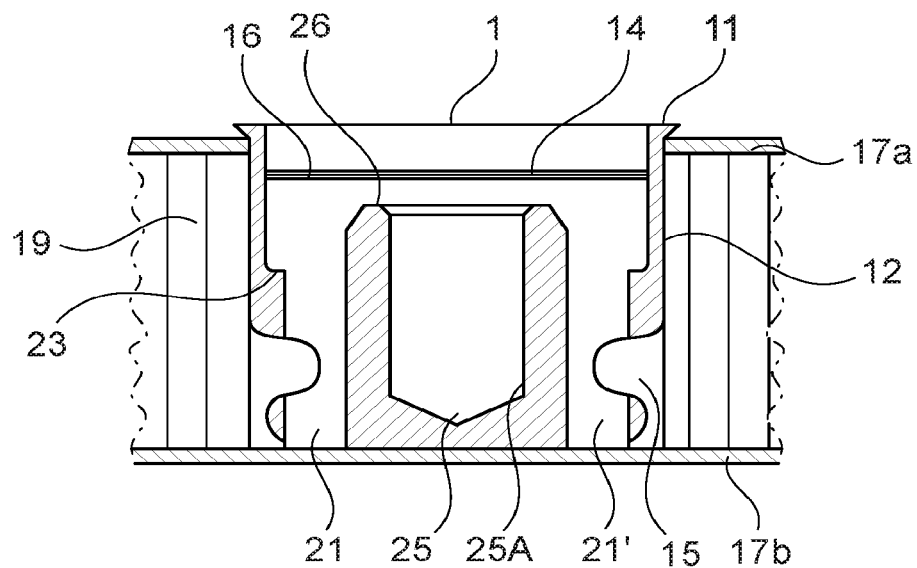
FIG. 12B is a schematic view in transverse section of the insert positioned in the hole in the sandwich panel.

In a second step, the insert 1 is positioned by pressing axially in the hole 15, so that the flared flanged end 11 of the insert 1 is slightly above the surface skin 17a of the sandwich panel 13 (FIG. 12B).

In a third step (FIG. 12C), the placement tool 101 is positioned over the flared flanged end 11 of the insert 1. The placement tool 101 comprises an end piece 105 and a male threaded member 103. The placement tool 101 is positioned with respect to the insert 1 in such a way that the end piece 105 bears against the flared flanged end 11 of the insert 1 and in such a way that the male threaded member 103 of the placement tool 101 screws into the internal tube 25 without re-emerging.

In a fourth step (FIG. 12D), axial pressure is applied to the flared flanged end 11 of the insert 1 using the end piece 105 of the placement tool 101, this pressure being indicated by the arrows P, so as to cause the flared flanged end 11 of the insert 1 to penetrate into the surface skin 17a of the sandwich panel 13. At the same time, the internal tube 25 is pulled using the male threaded member 103 in the opposite direction to the direction of the axial pressure P, as indicated by the arrow T. The flared flanged end 11 holding the insert 1 on the surface skin 17a allows the deformable peripheral wall 12 to deform.

The deformable peripheral wall portion 12 then forms an annular radial bulge 107 around the periphery of the hole 15 in the honeycomb of the core 19 behind the surface skin 17a of the sandwich panel 13, thus forming a first region I of mechanical connection between the insert 1 and the sandwich panel 13. At the end of this fitting step, the flared flanged end 11 of the insert 1 and the end of the internal tube 25 lie flush with the surface of the sandwich panel 13. At the end of this fourth step, the total height H of the insert 1 is therefore reduced.

The shortening of the insert 1 also brings about the creation of the gap 109 between the end of the anchoring stem 5 and the bottom of the hole 15 in the sandwich panel 13.

Next, the placement tool 101 is detached from the insert 1 by unscrewing the male threaded member 103.

In a fifth step, the curable substance 111 is injected directly through the first duct 21 of the anchoring stem 5 now accessible from the hollow of the cylindrical body 3.

The injection of said substance 111 is performed by the use of an injection needle, the end piece 41 of which is depicted in FIG. 12E. Injection through the first duct 21 of the anchoring stem 5 opens out via the circumferential groove 7 and via the peripheral rib 9 into the gap 109 between the insert 1 and the bottom of the hole 15 in the sandwich panel 13.

When the gap 109 is filled with the curable substance 111, the latter re-emerges via the second duct 21' of the anchoring stem. The curable substance 111 re-emerges through the exit opening of the second duct 21', referred to as the "overflow" in the transverse end wall 23 of the cylindrical body 3. The second duct 21' also acts as a "vent duct" allowing air compressed between the insert and the hole 15 in the sandwich panel 13 to be expelled. The expulsion of the air makes it possible to avoid the formation of air bubbles in the gap 109 weakening the collaboration between the insert 1 and the curable substance 111. When said curable substance 111 overspills from the outlet opening of the second, "overflow" duct 21', injection is then interrupted.

In a sixth step, the curable substance 111 injected in the previous step hardens in the gap 109 and in the ducts 21 and 21' of the anchoring stem 5 allowing the curable substance 111 to become anchored to the bottom skin 17b of the sandwich panel 13 so as to form a second region II of mechanical connection to guarantee optimal integrity of the assembly and prevent cohesive breakage of the curable substance 111.

The structural element 115 can then be attached to the sandwich panel 13 via a screw or a threaded shank 113, these elements being depicted in FIG. 12F. The screw or the threaded shank 113 has an external screw thread that complements the internal tapped thread 25A of the internal tube 25 and is inserted into the internal tube 25 via the open end 26 thereof.

A mechanical thread lock (not depicted in the figures) can be positioned on the one hand on the internal tapped thread 25A of the internal tube 25 and on the other hand on the screw thread of the screw or of the threaded shank 113, such a measure making it possible to increase the mechanical retention between said internal tube 25 and the screw 113 to avoid the loosening of the screw 113 from the insert 1 assembled in the sandwich panel 13 (visible in FIG. 12F).

The element 115 attached to the sandwich panel 13 is pressed directly against the sandwich panel 13, avoiding a potential lack of stability of the assembly (as visible in FIG. 12F).

The insert 1 thus produced allows simplified assembly with the sandwich panel 13, exhibiting two regions 1 and 11 of mechanical connection, which are situated between the insert 1 and the hole 15 of the sandwich panel 13. This assembly guarantees stable attachment of the element 115 attached to the sandwich panel 13 visible in FIG. 12F.

The transverse profiles of the circumferential groove 7 and of the peripheral rib 9 make it possible to round the transverse profile of the anchoring stem 5 to avoid the concentration of stresses leading to cracks in the curable substance 111 and impairing the second region II of connection between the insert 1 and the sandwich panel 13.

The injection of the curable substance 111 through a first duct 21 in the anchoring stem 5 makes it possible to avoid unwanted contamination of the internal tapped thread 25A of the internal tube 25 with an application of curable substance 111, thus ensuring better retention of the screw or of the threaded shank 113 to the sandwich panel 13 and making it possible for the assembly to be unscrewed once the curable substance 111 has polymerized. The emergence of curable substance 111 through the outlet opening of the second duct 21' makes it possible to obtain uniform filling of the gap 109 and allows the expulsion of air compressed in the gap 109 and that may lead to the formation of air bubbles impairing the collaboration between the anchoring stern 5 of the insert 1 and the curable substance 111. Finally, the emergence of curable substance 111 through the outlet opening of the second duct 21' means that it is possible to monitor the degree of filling with curable substance 111 injected into the assembly.

The invention claimed is:

1. An insert intended to be assembled in a hole in a sandwich panel, comprising:
    a hollow cylindrical body having a flanged end deformable by a placement tool allowing mechanical connection by deformation with a surface skin of said sandwich panel;
    an anchoring stern in continuation of the cylindrical body; and
    an internal tube intended to collaborate with the placement tool,
    wherein said anchoring stem has at least one circumferential groove and a peripheral rib, the circumferential groove and the peripheral rib each having a transverse profile that is rounded so as to be able to collaborate with a curable substance,
    wherein the internal tube is a blind tube,
    wherein the cylindrical body has, at an opposite end from the flange, a transverse end wall separating the cylindrical body from the anchoring stein and through which the internal tube passes, and
    wherein said anchoring stem comprises at least a first duct and a second duct which are parallel to an axis of revolution of the cylindrical body, the first and second ducts being positioned on either side of the internal tube and opening into the circumferential groove and through said transverse end wall, such that the curable substance can re-emerge through an exit opening of the second duct in the transverse end wall of the cylindrical body.

2. The insert as claimed in claim 1, wherein the transverse profiles of the circumferential groove and of the peripheral rib succeed one another continuously.

3. The insert as claimed in claim 1, wherein the circumferential groove and the peripheral rib have semicircular transverse profiles.

4. The insert as claimed in claim 3, wherein the semicircular transverse profiles of the circumferential groove and of the peripheral rib of the anchoring stem are interrupted by at least one cut parallel to an axis of revolution and wherein said cut is distant from the first duct and from the second duct of said anchoring stern.

5. The insert as claimed in claim 1, wherein the anchoring stem comprises two circumferential grooves and two peripheral ribs succeeding one another in alternation.

6. The insert as claimed in claim 5, wherein the peripheral ribs and the circumferential grooves are interrupted by the first duct and the second duct and wherein said first and second ducts have radial openings toward an outside.

7. The insert as claimed in claim 1, wherein the first duct and the second duct are formed through said circumferential groove and the peripheral rib, the first and second ducts opening into the circumferential groove and the peripheral rib, and through said transverse end wall.

8. The insert as claimed in claim 1, wherein:
    the first duct is at least partially conical or frustoconical, and the second duct is at least partially conical or frustoconical, or is cylindrical.

9. The insert as claimed in claim 8, wherein the first and second ducts are of different diameters.

10. The insert as claimed in claim 1, wherein said insert is produced in three pieces:
- a first piece comprising an insetting member with the cylindrical body and the anchoring stem separated from one another by the transverse end wall of the cylindrical body, the anchoring stem comprising an internal passage coaxial with the cylindrical body communicating with an internal hollow of oblong shape positioned in an end peripheral rib forming a free end of the anchoring stem, said internal hollow being accessible via an opening of a surface of said end peripheral rib,
- a second piece comprising the internal tube secured to a transverse foot at an end thereof, said internal tube being configured to be inserted into the internal passage of the anchoring stem and the transverse foot being configured to be housed in the internal hollow of the end peripheral rib, and
- a third piece comprising a cap configured to close said opening of the end peripheral rib.

11. The insert as claimed in claim 10, wherein the internal hollow has dimensions greater than dimensions of the transverse foot secured to the internal tube and wherein a diameter of the internal passage is less than or equal to a width of the internal hollow and greater than a diameter of the internal tube.

12. The insert as claimed in claim 10, wherein the opening on the surface of the end peripheral rib has an oblong shape with a lateral entrance allowing the cap to be inserted by sliding.

13. The insert as claimed in claim 1, wherein the cylindrical body of the insert comprises a deformable peripheral wall having at least two equidistant orifices.

14. A method for assembling an insert as claimed in claim 1, in a hole in a sandwich panel by a placement tool, wherein the method comprises:
- positioning the insert by axial pressing in the hole previously formed in the sandwich panel,
- applying axial pressure to the flanged end of the insert using an end piece of the placement tool to cause the flanged end of the insert to penetrate the surface skin of the sandwich panel, and simultaneously pulling the internal tube using the placement tool so as to deform a portion of a deformable peripheral wall of the cylindrical body of the insert and form a first region of mechanical connection between the insert and the sandwich panel so that the flanged end of the insert and the end of the internal tube come flush with the surface of the sandwich panel,
- injecting a curable substance via the opening and through the first duct of the anchoring stern, and
- stopping the injecting when the curable substance is detected in the second duct in the vicinity of the transverse end wall of the cylindrical body.

15. An assembly comprising an insert as claimed in claim 1 and a sandwich panel.

16. The insert as claimed in claim 1, wherein the anchoring stern has a cylindrical overall shape in the continuation of the cylindrical body, and
wherein a diameter of said anchoring stem at the peripheral rib is less than or equal to a diameter of the cylindrical body.

* * * * *